United States Patent
Phillip et al.

(10) Patent No.: US 10,632,556 B2
(45) Date of Patent: Apr. 28, 2020

(54) METHOD AND APPARATUS FOR ELIMINATING CUT TAPER

(71) Applicant: Kiffer Industries, Inc., Cleveland, OH (US)

(72) Inventors: Dale Phillip, Cleveland, OH (US); Goran Racic, Cleveland, OH (US)

(73) Assignee: KIFFER INDUSTRIES, INC., Cleveland, OH (US)

( * ) Notice: Subject to any disclaimer, the term of this patent is extended or adjusted under 35 U.S.C. 154(b) by 1102 days.

(21) Appl. No.: 14/536,151

(22) Filed: Nov. 7, 2014

(65) Prior Publication Data

US 2016/0129515 A1    May 12, 2016

(51) Int. Cl.
| | |
|---|---|
| B23K 9/095 | (2006.01) |
| B26D 5/00 | (2006.01) |
| B23K 9/013 | (2006.01) |
| B23K 9/12 | (2006.01) |
| B23K 37/04 | (2006.01) |
| B23K 10/00 | (2006.01) |
| B26F 3/00 | (2006.01) |
| B23K 26/08 | (2014.01) |

(52) U.S. Cl.
CPC ............ *B23K 9/0953* (2013.01); *B23K 9/013* (2013.01); *B23K 9/126* (2013.01); *B23K 10/00* (2013.01); *B23K 26/0884* (2013.01); *B23K 37/0408* (2013.01); *B26D 5/005* (2013.01); *B26F 3/004* (2013.01)

(58) Field of Classification Search
CPC ...... B23K 9/0953; B23K 9/013; B23K 9/126; B23K 10/00; B23K 26/0884; B23K 37/0408; B26D 5/005; B26F 3/004

USPC .................................. 219/121, 440, 121.57
See application file for complete search history.

(56) References Cited

U.S. PATENT DOCUMENTS

| | | |
|---|---|---|
| 5,866,872 A | 2/1999 | Lu et al. |
| 5,989,485 A | 11/1999 | Staacks et al. |
| 6,222,154 B1 | 4/2001 | Yamaguchi et al. |
| 6,274,841 B1 | 8/2001 | Ramakrishnan et al. |
| 6,705,921 B1 | 3/2004 | Shepherd |
| 6,740,844 B2 | 5/2004 | Rossi |
| 6,772,040 B1 | 8/2004 | Picard et al. |
| 6,900,408 B2 | 5/2005 | Picard et al. |
| 6,922,605 B1 | 7/2005 | Olsen |

(Continued)

OTHER PUBLICATIONS

TMC4500 ST Heavy Duty Cutting System, Messer Cutting Systems, Apr. 2008, 2 pages.

*Primary Examiner* — Tu B Hoang
*Assistant Examiner* — Thomas J Ward
(74) *Attorney, Agent, or Firm* — Wegman Hessler

(57) ABSTRACT

Methods and apparatus for a material cutting system are provided. The system has a table for receiving a work piece. A cutting head cuts the work piece on the table and includes a positioning apparatus. The positioning apparatus moves the cutting head relative to the work piece at an angle relative to a planar surface of the work piece. The material cutting system also includes a computerized numeric controller (CNC) controlling the positioning apparatus. The CNC references a table of values within application software to find a material value and a work piece thickness value within the table to determine the angle from the perpendicular to produce a kerf edge that is formed at a particular angle to the work piece planar surface.

8 Claims, 8 Drawing Sheets

(56) References Cited

U.S. PATENT DOCUMENTS

| | | | |
|---|---|---|---|
| 6,947,802 B2 * | 9/2005 | Picard | B23K 10/00 |
| | | | 219/121.39 |
| 7,071,441 B1 | 7/2006 | Bulle | |
| 7,074,360 B2 | 7/2006 | Wolven | |
| 7,087,855 B2 | 8/2006 | Yamaguchi et al. | |
| 7,161,111 B2 | 1/2007 | Schneider | |
| 8,395,075 B2 | 3/2013 | Phillip et al. | |
| 8,525,067 B2 | 9/2013 | Muscat-Taylor et al. | |
| 8,754,349 B2 | 6/2014 | Phillip et al. | |
| 8,946,583 B2 * | 2/2015 | Riemann | B23K 10/00 |
| | | | 219/121.39 |
| 2003/0065424 A1 | 4/2003 | Erichsen et al. | |
| 2010/0301020 A1 * | 12/2010 | Phillip | B23K 10/00 |
| | | | 219/121.44 |

* cited by examiner

METHOD AND APPARATUS FOR ELIMINATING CUT TAPER

BACKGROUND

1. Field of the Disclosure

This application relates generally to material cutting machines and, in particular, relates to a method and apparatus for positioning a cutting head to eliminate cut taper.

2. Description of Related Art

Material cutting systems such as plasma arc torches are widely used for cutting metallic materials and can be employed in automated systems for automatically processing a work piece. The system may include the plasma arc torch, an associated power supply, a positioning apparatus, and an associated computerized numeric controller (CNC). At least one of the plasma arc torch and the work piece may be mounted on the positioning apparatus, which provides relative motion between the tip of the torch and the work piece to direct the plasma arc along a processing path.

The CNC communicates with the positioning apparatus to direct the motion of the torch to enable the work piece to be cut to a desired pattern. However, with some cut geometries, such as circles, prior art positioning systems that control the torch only in mutually orthogonal X, Y, and Z-axes produce a kerf that ends up being uneven or non-parallel with the vertical. In the example of a round hole cut through the work piece, the diameter of the resultant cylindrical waste piece is sometimes greater at the upper surface than the diameter at the lower surface. Additionally, at times, it would be desired to cut shapes with sides that are perpendicular to the upper surface of the work piece based upon several variables such as the composition of the work piece, the thickness of the work piece, etc. Therefore, there is a strong need to provide an improved positioning apparatus for a plasma torch system that enables the operator or the CNC to better control the positioning of the torch to compensate for the angle of the side of the kerf.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a material cutting system including a table for receiving a work piece. The material cutting system also includes a cutting head for cutting the work piece on the table. The material cutting system further includes a positioning apparatus for controlling the position and orientation of the cutting head with respect to a work piece on the table. The positioning apparatus moves the cutting head relative to the work piece and the positioning apparatus positions the cutting head at an angle relative to a planar surface of the work piece such that the cutting head is held at an angle from a perpendicular with the planar surface of the work piece. The material cutting system still further includes a computerized numeric controller including an application software program. The computerized numeric controller controls the positioning apparatus, and the application software program comprises a table of values. The application software program references a material value and a work piece thickness value within the table of values to determine the angle from the perpendicular to produce a kerf edge positioned at a particular angle to the planar surface of the work piece. The computerized numeric controller positions the cutting head at the angle from the perpendicular.

According to another aspect, the subject application involves a method of operating a material cutting system including a computerized numeric controller. The method includes the step of placing a work piece to be cut on a table of the material cutting system. At least a portion of the work piece has a planar surface facing away from the table. The method also includes the step of positioning a cutting head adjacent the planar surface of the work piece using a positioning apparatus. The method further includes the step of referencing a table of values through a piece of application software within the computerized numeric controller. The application software references a material value and a work piece thickness value within the table of values to determine an angle from a perpendicular with the planar surface. The method still further includes the step of positioning the cutting head relative the planar surface of the work piece based upon the material value and the work piece thickness value such that the cutting head is held at the angle from the perpendicular with the planar surface between about 1 and about 4 degrees to back burn a produced kerf such that a kerf edge is positioned at a particular angle to the planar surface of the work piece.

According to yet another aspect, the subject application involves a method of operating a material cutting system including a computerized numeric controller and application software. The method includes the step of using the application software to convert a design file to machine code, wherein the machine code manipulates a positioning apparatus to move a cutting head in a desired cut pattern. The application software includes an embedded table. The method also includes the step of piercing the work piece by operating the cutting head at a point within a perimeter of the desired cut pattern. The method further includes the step of angling the cutting head relative to a planar surface of the work piece based upon a variable within the embedded table such that the cutting head is held at the angle from the perpendicular with the planar surface to back burn a produced kerf such that a kerf edge is formed at a particular angle relative to the planar surface of the work piece. The method still further includes the step of cutting the work piece by moving the cutting head in a straight line from the piercing point toward the perimeter of the desired cut pattern until the straight line intersects the perimeter of the desired cut pattern. The method includes the step of cutting the desired cut pattern. The method also includes the step of overlapping a portion of the cut pattern after the cutting head has cut the entire desired cut pattern. The method further includes the step of moving the cutting head within the perimeter of the desired cut pattern.

BRIEF DESCRIPTION OF THE DRAWINGS

The structure, operation, and advantages of the presently disclosed embodiment of the disclosure will become apparent when consideration of the following description taken in conjunction with the accompanying drawings wherein.

Corresponding reference characters indicate corresponding parts throughout the views of the drawings.

DETAILED DESCRIPTION

Figure 1:
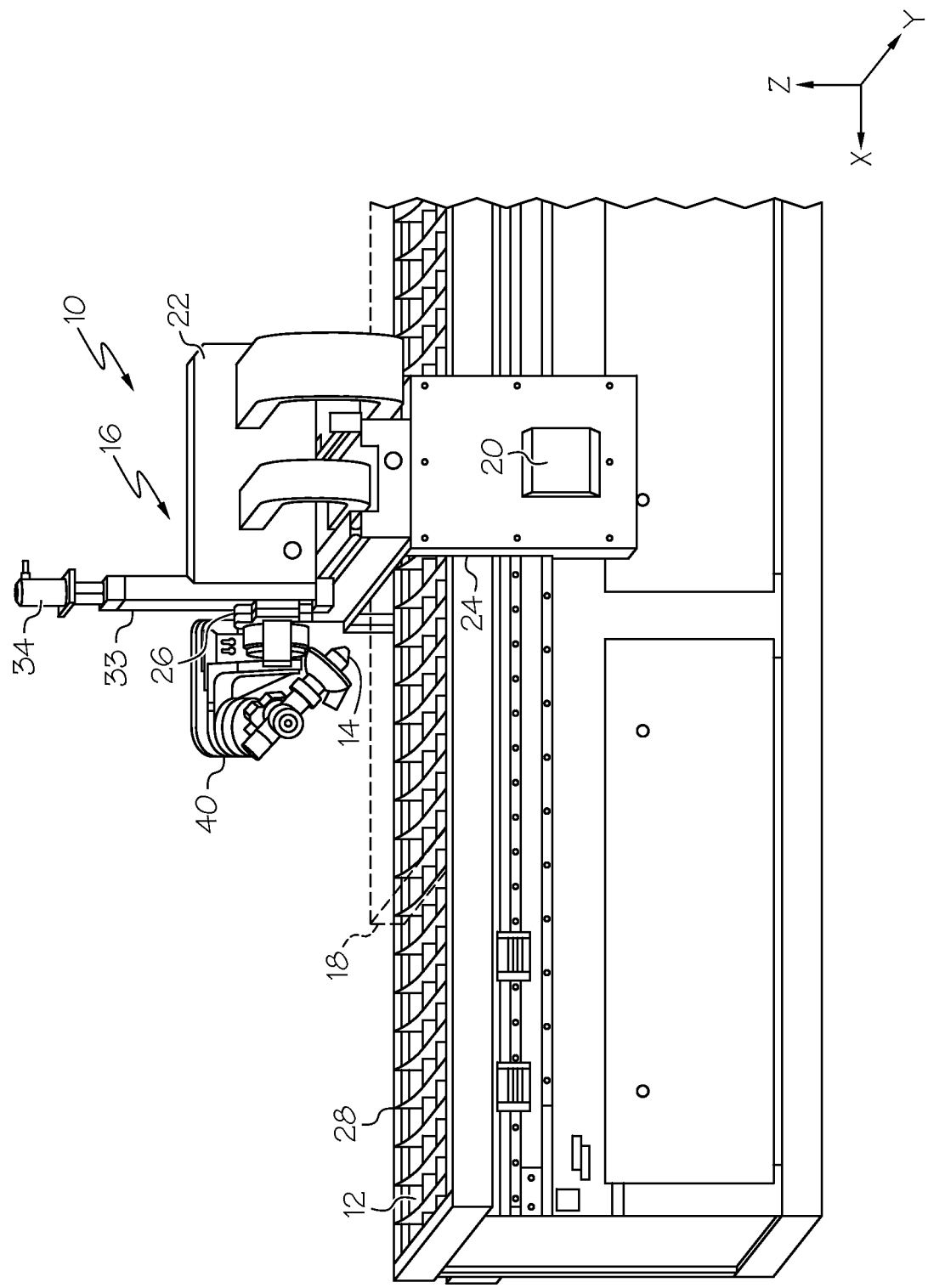
FIG. 1 is a perspective view of a plasma arc torch system in accordance with an exemplary embodiment of the disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Referring now to the drawings, FIG. 1 illustrates a material cutting system 10 in accordance with an exemplary embodiment of the present disclosure. For the purposes of this disclosure, examples of the material cutting system 10 can include, but are not limited to gas operated cutting systems (e.g., oxy fuel); liquid operated cutting systems (e.g., water jet); laser cutting systems. The remainder of this disclosure describes the cutting system 10 as a plasma arc cutting system employing a plasma arc torch, however this is not meant to be limiting to the disclosure.

The system 10 includes a generally planar table 12 for receiving a work piece 18, a plasma arc torch 14, and a positioning apparatus 16 for controlling the position and orientation of the plasma arc torch 14 with respect to the work piece 18 on the table 12. The plasma arc torch 14 can be referred to as the "cutting torch" and/or the "torch." The torch 14 may be of any suitable conventional or special design, such as a dual gas plasma cutting torch.

Although a detailed illustration of the plasma arc torch 14 is omitted herein, it should be noted that plasma arc torches use a superheated stream of ionized gas issued at high velocity to cut a stock material and the high temperature discharge from the torch for cutting the work piece 18 is generally referred to as a "flame" or a "plasma jet." An electrode is connected, through a torch cable for supplying plasma current, to one terminal (minus terminal) of a plasma power source unit and the other terminal (plus terminal) of the plasma power source unit is connected to the work piece 18 through a parent material cable. The circuit for the work piece 18 diverges and is then connected to a nozzle through a resister and an on-off switch. Attached to the leading end (serving as a plasma arc generating point) of the electrode is a heat-resistant insert made from a high melting point material (e.g., hafnium, zirconium and alloys) which can withstand the high heat of the plasma arc. Plasma arc torches are well known in the industry and need not be described in further detail herein. A control station 20 is mounted adjacent the table 12 to provide the positioning apparatus 16 with position control. The control station 20 contains a suitable computerized numeric controller (CNC) 21 (best seen schematically in FIG. 4).

In one example, the positioning apparatus 16 has five degrees of freedom about which it can move the plasma arc torch 14 relative the work piece 18. The positioning apparatus 16 includes an overlaying gantry 22 with a traveling beam 24 disposed so as to traverse the table 12. Disposed on the traveling beam 24 is a carriage 26 on which the plasma torch 14 is mounted. The traveling beam 24 is movable by operation of an X-axis motor (not shown) in the direction of the X-axis along an X-axis rail 28, which extends in a longitudinal direction (i.e., the X-axis direction) of the table 12. The carriage 26 is movable by operation of a Y-axis motor (not shown) in the direction of the Y-axis along a Y-axis rail 32 (best seen in FIG. 2) disposed on the traveling beam 24. In one example, two Y-axis servomotors can be provided, one on either side of the Y-axis rail. In another example, one of the Y-axis servomotors can be slaved to the other Y-axis servomotor. The carriage is movable by operation of mechanical slider 33 connected to a Z-axis motor 34 for movement in a vertical direction (i.e., the Z-axis direction) relative to the table 12. By controlling each motor, the plasma torch 14 is moved to a desired position on the table 12 to cut the work piece 18.

Figure 2:
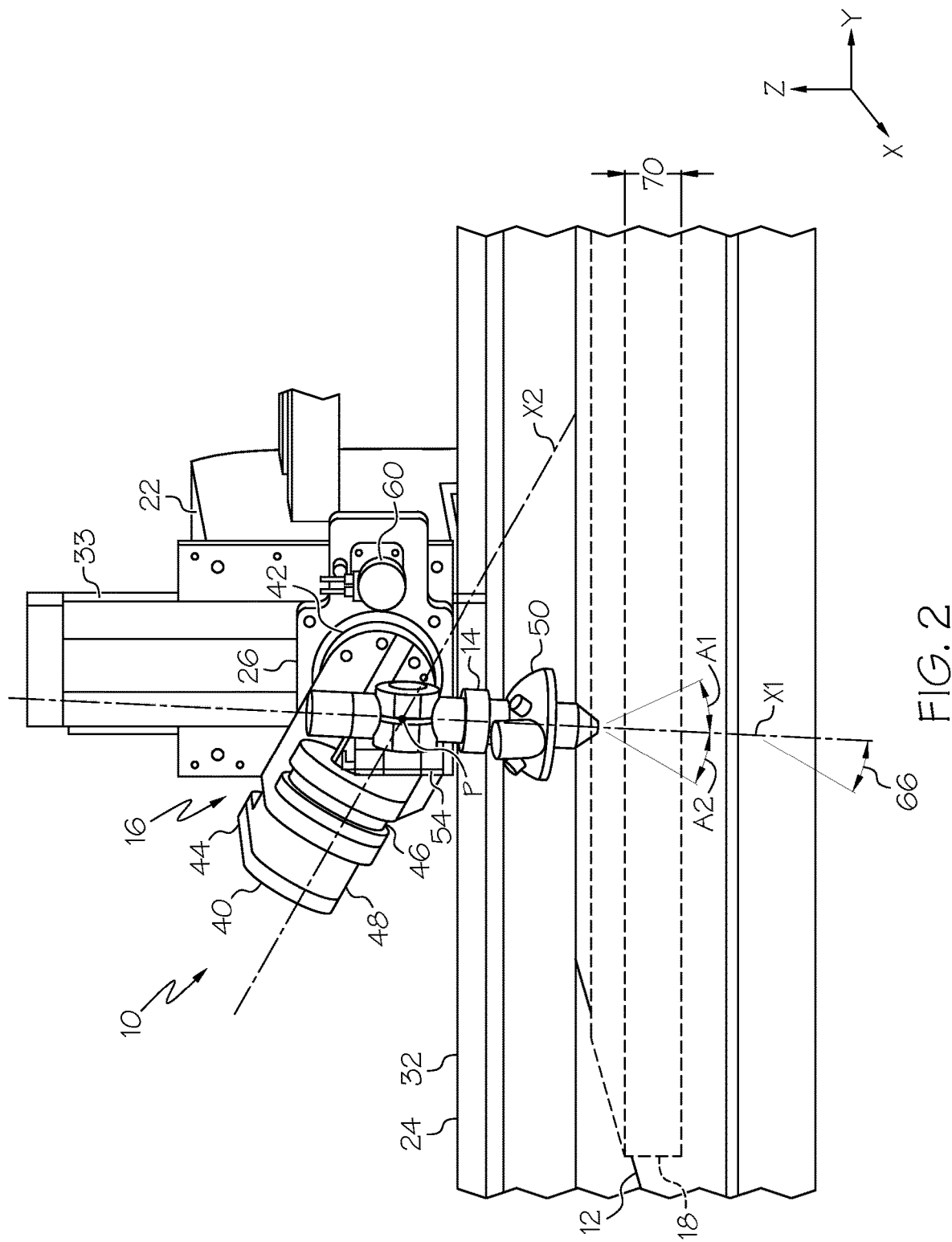
FIG. 2 is an enlarged perspective view of a portion of the plasma arc torch system of FIG. 1.
Figure 3:
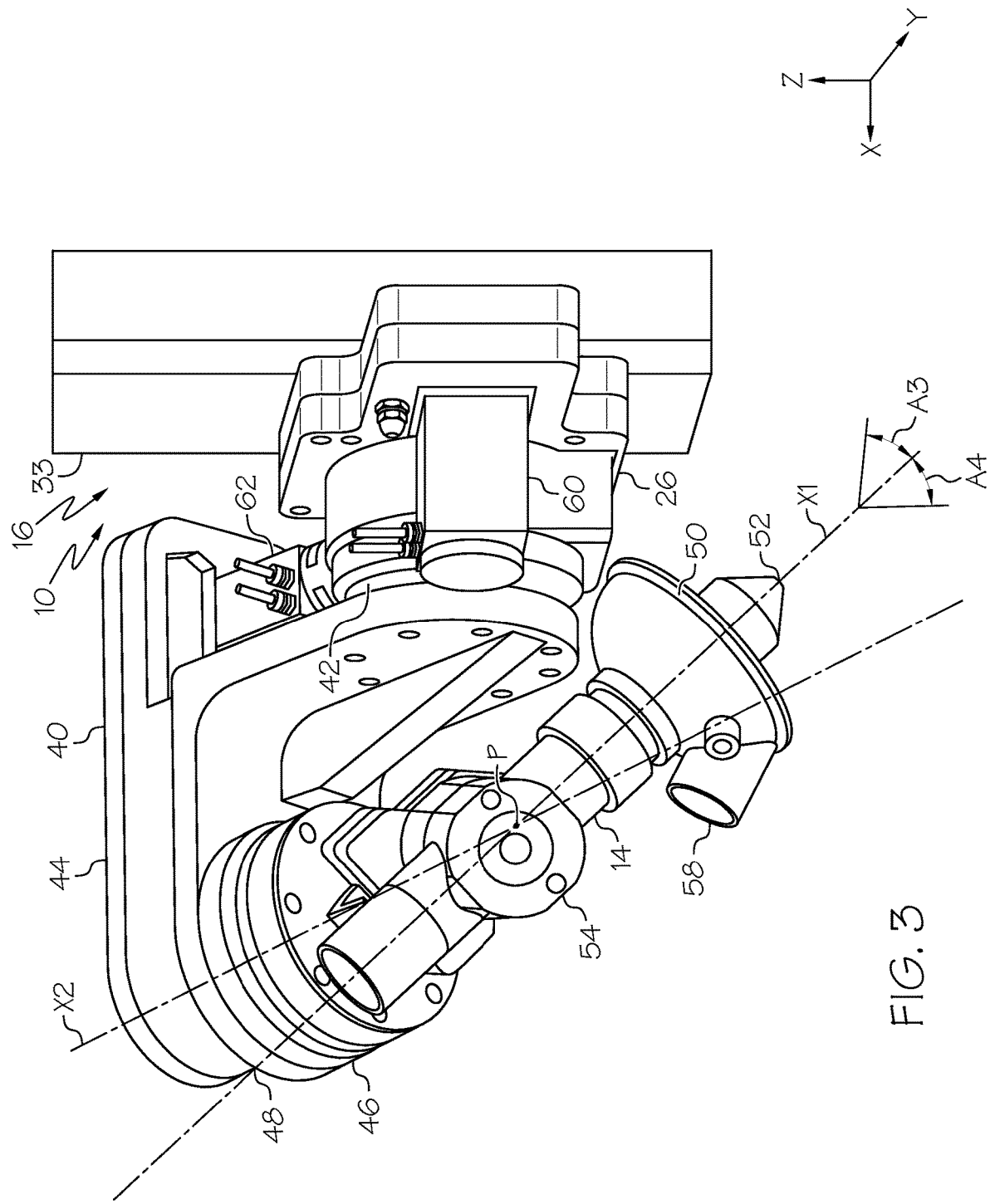
FIG. 3 is an enlarged perspective view of a portion of the plasma arc torch system of FIG. 1.

As can be better seen in FIGS. 2 and 3, a turret 40 is mounted to the carriage 26. The turret 40 permits the torch 14 to rotate about two different axes so that it can be tilted at an angle relative the mutually orthogonal X, Y, and Z-axes. The turret contains a first pivot mount 42, a boom 44 extending from the first pivot mount 42, and a second pivot mount 46 on a distal end 48 of the boom 44. The pivot mounts 42, 46 can also be known as robot knuckles, gear reducers, rotary drives, etc. The plasma arc torch 14 and an exhaust shroud 50 at least partially encircling discharge tip 52 of the torch 14 are mounted on a tool holder 54 on the second pivot mount 46. Torch gas supply lines (not shown) extend from a port (not shown) on the rear end of the torch 14. In one example, the shroud 50 is movable along the body of the torch 14 to position the shroud 50 close to the work piece 18 without bumping into the work piece 18 when the torch 14 is positioned at an angle such as for a beveled cut. For example, when the torch 14 is tipped at an angle relative the work piece 18, the shroud 50 is moved up along the torch 14 so that the shroud 50 does not contact the work piece 18. When the torch 14 is substantially vertical relative the plane of the work piece 18, the shroud is lowered to maintain close proximity with the work piece 18. Desirably, the shroud 50 is connected to the torch 14 such that a pneumatic actuator (not shown) may be used to raise and lower the shroud 50.

A flexible hose (not shown) is connected to a duct 58 on the exhaust shroud 50. The hose is connected to a vacuum source (not shown) such that the vacuum source creates a low-pressure area in the immediate vicinity of discharge tip 52 of torch 14. To actively collect and remove fluid debris such as noxious gases and vaporized matter produced by torch 14, the exhaust shroud 50 is used to communicate a low-pressure area in the immediate vicinity of discharge tip 52.

A suitable first motor, such as a first servomotor 60 coupled to a timing belt and ring gear (not shown), selectively rotates the first pivot mount 42 for positioning the torch 14. In one example, the first servomotor 60 rotates the first pivot mount 42 about an axis parallel to the X-axis. The second pivot mount 46 with a second servomotor 62 selectively rotates the second pivot mount 46 for positioning of the torch 14. In another example, the second servomotor 62 rotates the second pivot mount 46 about an axis parallel to the Z-axis when the first pivot mount 42 is in an initial or home position. Accordingly, once an understanding of the positioning apparatus 16 is had, it should be appreciated that the torch 14 may be moved to cut a wide variety of shapes in work piece 18, including circular, square, slotted and other holes. Importantly, the torch 14 may be positioned to compensate for the angle of the side of the kerf by back burning during cutting of the work piece 18 or to provide a selected bevel cut where desired.

In operation, a user places the work piece 18 on the cutting table 12 and mounts the plasma arc torch 14 on the positioning apparatus 16 to provide relative motion between the tip 52 of the torch 14 and the work piece 18 to direct the plasma arc along a processing path. Typically, the user provides a start command to the CNC 21 to initiate the cutting process. The CNC 21 communicates with the positioning apparatus 16 to direct the motion of the torch 14 to enable the work piece 18 to be cut to a desired pattern. The positioning apparatus 16 uses signals from the CNC 21 to direct the torch 14 along a desired cutting path. Position information is returned from the positioning apparatus 16 to the CNC 21 to allow the CNC 21 to operate interactively with the positioning apparatus 16 to obtain an accurate cut path. The CNC 21 also controls the height of the shroud 50 on the torch 14 by controlling the pneumatic actuator.

In one example, the control station 20 contains a torch height controller (THC) that provides an optimum voltage for a desired metal cutting process. As one skilled in the art will understand, there is a direct relationship between cut voltage and a standoff. The standoff refers to the gap between the surface of the work piece 18 and the tip 52 of the torch 14. The THC directs the mechanical slider 33 driven by the z-axis motor 34. An encoder provided inside the motor 34 is in electrical communication with the CNC 21. The encoder provides location information from the slider 33 back to the CNC 21. The torch 14 is in electrical communication with a voltage feedback card provided inside the control station 20 to provide voltage information to the CNC 21. The CNC 21 uses the location information provided by the encoder, and voltage information provided by the voltage feedback card, in conjunction with a desired work piece cut path programmed into the CNC 21, to provide an input signal to the motor 34 to change the standoff. The use on an encoder and a voltage feedback card are known in the art and need not be discussed herein in further detail.

To start the cutting process, the THC and CNC 21 direct the torch 14 until contact is made with the work piece 18 three times in three different places on the surface of the work piece 18. Each time the torch 14 contacts the work piece 18, a signal is sent from the voltage feedback card to the CNC 21 to indicate the position of the work piece 18. The CNC 21 uses the three signals to calculate the planar surface of the work piece 18. In other examples, any means for detecting the surface of the work piece 18 three times to calculate the planar surface may be used without departing from the scope of the disclosure. After the surface of the work piece 18 has been determined, the torch 14 is refracted to a pierce height as determined by the CNC 21. After the pilot arc in the torch 14 has transferred to a cutting arc, a signal is sent from the voltage feedback card to the CNC 21 allowing the CNC 21 to control the motion of the torch 14.

In one example, the height of the torch 14 is calibrated relative the work piece 18 with the work piece 18 on the table 12. Initially, the torch 14 is place in a substantially perpendicular orientation to the plane of the work piece 18. The torch 14 is lowered with the z-axis motor 34 until contact with the work piece 18 is detected by a known means such as reading the current limit on the servomotor or Ohmic sensing between the torch and work piece 18, or any other suitable method. The torch 14 is then raised a determined height above the work piece 18. This single contact between the torch 14 and the work piece 18 is satisfactory to establish the height of the torch 14 from the work piece 18.

The torch 14 is then rotated relative the work piece a first specified angle A1 by rotating the first pivot mount 42 with the first servomotor 60. The first angle A1 can be between about 20 and about 60 degrees from vertical. In one example, the first pivot mount 42 rotates the torch 14 a first angle A1 of 45 degrees. The torch 14 is then lowered with the z-axis motor 34 until contact with the work piece 18 is detected. After contact is made, the torch 14 is raised and rotated back through vertical to a second specified angle A2 relative the work piece by rotating the first pivot mount 42 with the first servomotor 60. The second angle A2 is desirably between about 20 and about 60 degrees from vertical in the opposite direction from the first angle A1. In one embodiment, the second angle A2 has the same magnitude as the first angle A1 but is in the opposite direction. With the torch 14 positioned at the second angle A2, it is lowered until contact with the work piece 18 is detected. The torch 14 is then raised and rotated back to a substantially vertical condition. The first and second angles A1, A2 are shown in FIG. 2. Each of the first and second angles A1, A2 are formed between a vertical z-axis and the X1 axis of the torch 14 as it is rotated about a central axis of the first pivot mount 42. The first and second angles A1, A2 lie within the y-z plane as defined by the rectilinear coordinate system shown in FIG. 2.

Turning to FIG. 3, the torch 14 is then rotated relative the work piece a third specified angle A3 by rotating the second pivot mount 46 with the second servomotor 62. The torch 14 is moved in a plane to the third angle A3 that is orthogonal to the plane in which the torch 14 was moved when positioning at the first and second angles A1 and A2. The third angle A3 is desirably between about 20 and about 60 degrees from vertical. In one embodiment, the second pivot mount 46 rotates the torch 14 a third angle A3 of 45 degrees. The torch 14 is then lowered with the z-axis motor 34 until contact with the work piece 18 is detected. After contact is made, the torch 14 is raised and rotated back through vertical to a fourth specified angle A4 relative the work piece by rotating the second pivot mount 46 with the second servomotor 62. The fourth angle A4 is desirably between about 20 and about 60 degrees from vertical in the opposite direction from the third angle A3. In one embodiment, the fourth angle A4 has the same magnitude as the third angle A3, but is in the opposite direction. With the torch 14 positioned at the fourth angle A4, it is lowered until contact with the work piece 18 is detected. The third and fourth angles A3, A4 are shown in FIG. 3. Each of the third and fourth angles A3, A4 are formed between a vertical z-axis and the X1 axis of the torch 14 as it is rotated about a central axis of the second pivot mount 46. The first and second angles A1, A2 lie within the x-z plane as defined by the rectilinear coordinate system shown in FIG. 3.

In one example, the height of the torch 14 above the work piece 18 is detected and calibrated as previously described. The plasma arc torch system 10 then conducts the previously described operation of rotating the torch through the first, second, third, and fourth angles A1, A2, A3, and A4, contacting the work piece 18 at each position. This operation using the angles A1 through A4 is used to calculate and calibrate the distance between the tip 52 of the torch 14 and the intersection point P of the axis X1 through the center of the torch 14 and the axis X2 extending from the center of the second pivot mount 46. This distance is used in the CNC 21 to accurately control the position and angle of the torch 14 during cutting operations. In another example, the calibration then automatically adjusts the torch 14 to be perpendicular to the work piece 18.

In one example, during operation of the cutting system 10, the positioning apparatus 16 orients the torch 14 relative the planar surface of the work piece 18 such that it has a small angle 66 or inclination so as to compensate for uneven edge sides of the kerf that would otherwise be formed if the torch 14 were held orthogonal to the plane of the work piece 18 at the location being cut. These uneven edge sides can be referred to as the plasma torch cut taper. It is at times beneficial to minimize and/or eliminate undesired results of the plasma torch cut taper by angling the torch 14 based upon several variables to produce a kerf edge that is at a particular angle (e.g., perpendicular) to the planar surface of the work piece 18. A perpendicular kerf edge can eliminate costly and time consuming secondary machining and/or finishing operations that are often required to finish the cut work piece 18. In one example, the positioning apparatus 16 adjusts the first and second pivot mounts 42, 46 on the turret 40 such that the torch 14 is held at an angle of between about 1 and about 10 degrees, and more particularly between about 1 and about 4 degrees from vertical in order to back burn the kerf to produce a kerf edge that is perpendicular relative the planar surface of the work piece 18. In other words, the torch 14 is held at an angle to produce a kerf edge that forms a right angle to the plane of the work piece 18. It is to be understood that particular cuts of the work piece 18 may require kerf edges positioned at angles that are not perpendicular to the plane of the work piece 18. This apparatus and methods disclosed herein are intended to enable creation of these other angles as well.

Figure 4:
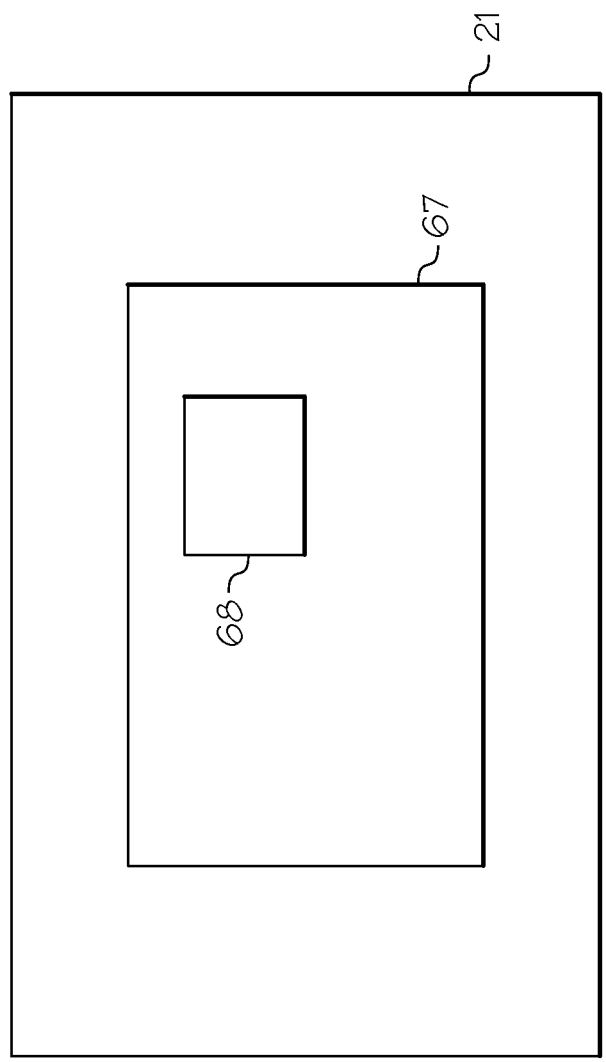
FIG. 4 is a schematic representation of a table stored within a control station of the plasma arc torch system of FIG. 1.

Turning to FIG. 4, the CNC 21 can include application software 67. The application software 67 can be used to convert various design files into machine code. The design files can include, but are not limited to files designated as ".dxf" files. The machine code is then used to control the positioning apparatus 16 to move the torch 14 in relation to the work piece 18 to make cuts within the work piece 18 as they are described within a particular design file. The application software 67 can also include an embedded table of values 68. The table of values 68 can include any number of variables relating to the work piece 18. Placing the variables into the table of values 68 can be accomplished through manual entry by an operator of the CNC 21, by a designer of the pattern to be cut and transferred electronically as a portion of an electronic design file representing the desired cut pattern, or by any other suitable means. These variables can include, but are not limited to a material value, a work piece thickness value, a position cut value, a consumable wear value, surface finish of the work piece 18, and the desired hole diameter. The application software 67 references these values within the table of values 68 to determine the angle 66 from the perpendicular at which to place the torch 14 in order to produce a kerf edge that is formed at a particular angle to the planar surface of the work piece. In one example, the kerf edge is formed substantially perpendicular to the planar surface of the work piece 18. The CNC 21 then controls the positioning apparatus 16 based upon the values the application software 67 obtained from the table of values 68. In one example, the table of values 68 can be constructed empirically.

It is to be understood that the variables within the embedded table of values 68 can also be used to calculate or determine machine outputs other than the angle 66 from the perpendicular to the planar surface of the work piece 18. Other examples of machine outputs can include, but are not limited to, lead-in length, lead-out length, radius of a lead-out (if applicable), cut speed, gas flow control, etc.

In one example, the CNC 21 can reference the table of values 68 for a particular cutting operation. The CNC 21 references the table of values 68 to locate the material value. The material value can include any type of signifier that represents the constituent material of the work piece 18 or at least a significant portion of the constituent material. The CNC 21 can then determine if the angle 66 from the perpendicular should be modified in order to produce a kerf edge that is perpendicular relative to the planar surface of the work piece 18. As an example, a high-carbon steel work piece may exhibit properties during the cutting operation that differ from the properties of a low-carbon steel work piece. The CNC can then determine the angle 66 from the perpendicular and communicate with the positioning apparatus 16 to move the torch 14 to the angle 66 that will produce a kerf edge that is formed at a particular angle (e.g., perpendicular) relative to the planar surface of the work piece 18, based upon the material value.

The CNC 21 also references the table of values 68 to locate the work piece thickness value. The work piece thickness value can include a numerical value that represents the thickness of the work piece 18. The CNC 21 can then determine if the angle 66 from the perpendicular should be modified in order to produce a kerf edge that is perpendicular relative to the planar surface of the work piece 18. As an example, a ½-inch thick work piece may require a different torch angle 66 to produce a kerf edge that is perpendicular when compared to a 1-inch thick work piece. The CNC 21 can then determine the angle 66 from the perpendicular and communicate with the positioning apparatus 16 to move the torch 14 to the angle 66 that will produce a kerf edge that is formed at a particular angle (e.g., perpendicular) relative to the planar surface of the work piece 18 for the particular thickness of the work piece 18.

The CNC 21 can also reference the table of values 68 to locate the position cut value. The position cut value can include a numerical value that represents an interior cut or an exterior cut of the work piece 18. The CNC 21 can then determine if the angle 66 from the perpendicular should be modified in order to produce a kerf edge that is perpendicular relative to the planar surface of the work piece 18. As an example, the pattern to be cut on the cutting table 12 can include a through hole. The plasma arc emanating from the torch 14 often trails behind and toward the center of the curvilinear cut path. As a result, it is often beneficial to tilt the torch 14 outward from the perpendicular and the center of the cut hole to produce a kerf edge that is perpendicular relative to the planar surface of the work piece. Alternatively, if the processing path is designed to create a curvilinear processing path on the exterior of the resultant piece, it is often beneficial to tilt the torch 14 inward from the perpendicular and the center of the resultant piece to produce a kerf edge that is perpendicular relative to the planar surface of the work piece. The CNC 21 can then determine the angle 66 from the perpendicular and communicate with the positioning apparatus 16 to move the torch 14 to the angle 66 that will produce a kerf edge formed at a particular angle (e.g., perpendicular) relative to the planar surface of the work piece 18 for the particular processing path or position cut of the work piece.

The CNC 21 can also reference the table of values 68 to locate the consumable wear value. In one example, the consumable wear value can include a numeric value that represents the amount of operating time logged on the electrode within the torch 14. In another example, the consumable wear value can include a numeric value that represents the number of work piece 18 piercings made by the electrode within the torch 14. In yet another example, the consumable wear value can include a numeric value that represents an ampere value at which the plasma arc torch is operating. The CNC 21 can then determine if the angle 66 from the perpendicular should be modified in order to produce a kerf edge that is perpendicular relative to the planar surface of the work piece 18. Each of the operating time, the number of piercings, and the ampere value can affect the plasma arc emanating from the torch 14. In one example, the electrode of the torch 14 can be a consumable commodity. The electrode can deteriorate with longer operating times, higher number of piercings, and higher amperage operation. As such, the electrode deterioration can affect the angle of the kerf edge. Using the information from the table, the CNC 21 can then determine the proper corrective angle 66 from the perpendicular and communicate with the positioning apparatus 16 to move the torch 14 to the angle 66. The adjusted angle 66 will produce a kerf edge that is perpendicular relative the planar surface of the work piece 18 to account for the changed plasma arc of the consumable electrode within the torch 14. Of course, any combination of the operating time logged, number of piercings, and the ampere value can be used to determine the consumable wear value.

In another example, the plasma arc torch system 10 can be used to cut holes within the work piece 18 having a kerf edge that is formed at a particular angle to the surface of the work piece 18. In one example, the kerf edge is perpendicular to the surface of the work piece 18. An operator can simply place the work piece 18 onto the planar table 12, input the desired hole diameter and the thickness of the work piece 18. At that point, the application software 67 references the table embedded within the application software 67 to calculate, determine, or find the proper angle 66 of the torch 14 to produce the desired kerf edge angle and automatically cut the hole. The resultant hole will then have a kerf edge that is perpendicular (or any other suitable desired angle) to the planar surface of the work piece 18 for the particular thickness of the work piece without any further information supplied by the operator.

Figure 5:
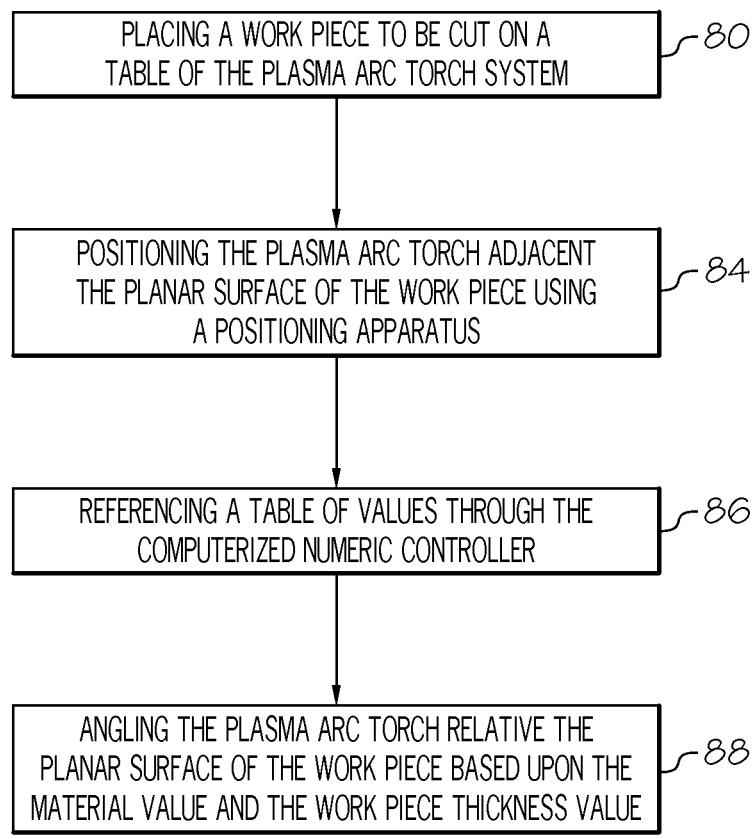
FIG. 5 is a top level flow diagram of a method of operating a plasma arc torch system of FIG. 1 in accordance with an aspect of the present disclosure.

Turning to FIG. 5, a method of operating a plasma arc torch system including a computerized numeric controller will now be described. The method includes the step 80 of placing a work piece to be cut on a table of the plasma arc torch system, wherein at least a portion of the work piece has a planar surface facing away from the table. The method also includes the step 84 of positioning the plasma arc torch adjacent the planar surface of the work piece using a positioning apparatus. As previously described, the height of the torch can be calibrated relative the work piece with the work piece on the table. Additionally, location information provided by the encoder and voltage information provided by the voltage feedback card, in conjunction with a desired work piece cut path programmed into the CNC, provide an input signal to the motor to change the standoff between the torch and the work piece.

The method also includes the step 86 of referencing a table of values through the CNC, wherein the CNC references a material value and a work piece thickness value within the table of values to determine an angle from a perpendicular with the planar surface. The CNC evaluates the values to find the proper angle of the torch that will produce a vertical kerf edge in the work piece. The method also includes the step 88 of angling the plasma arc torch relative the planar surface of the work piece based upon the material value and the work piece thickness value such that the torch is held at the angle from the perpendicular with the planar surface between about 1 and about 4 degrees to back burn a produced kerf such that a kerf edge is perpendicular relative to the planar surface of the work piece.

Other examples of the method can include the step of calculating the planar surface of the work piece by contacting the work piece with the torch at least three times. The method can also include the step of sending a signal from the voltage feedback card to the CNC to indicate the position of the work piece. Another example of the method can be modified wherein the step of referencing the table of values further includes referencing a position cut value within the table of values to determine the angle from the perpendicular. Yet another example of the method can be modified wherein the step of referencing the table of values further includes referencing a consumable wear value within the table of values to determine the angle from the perpendicular.

Figure 6:
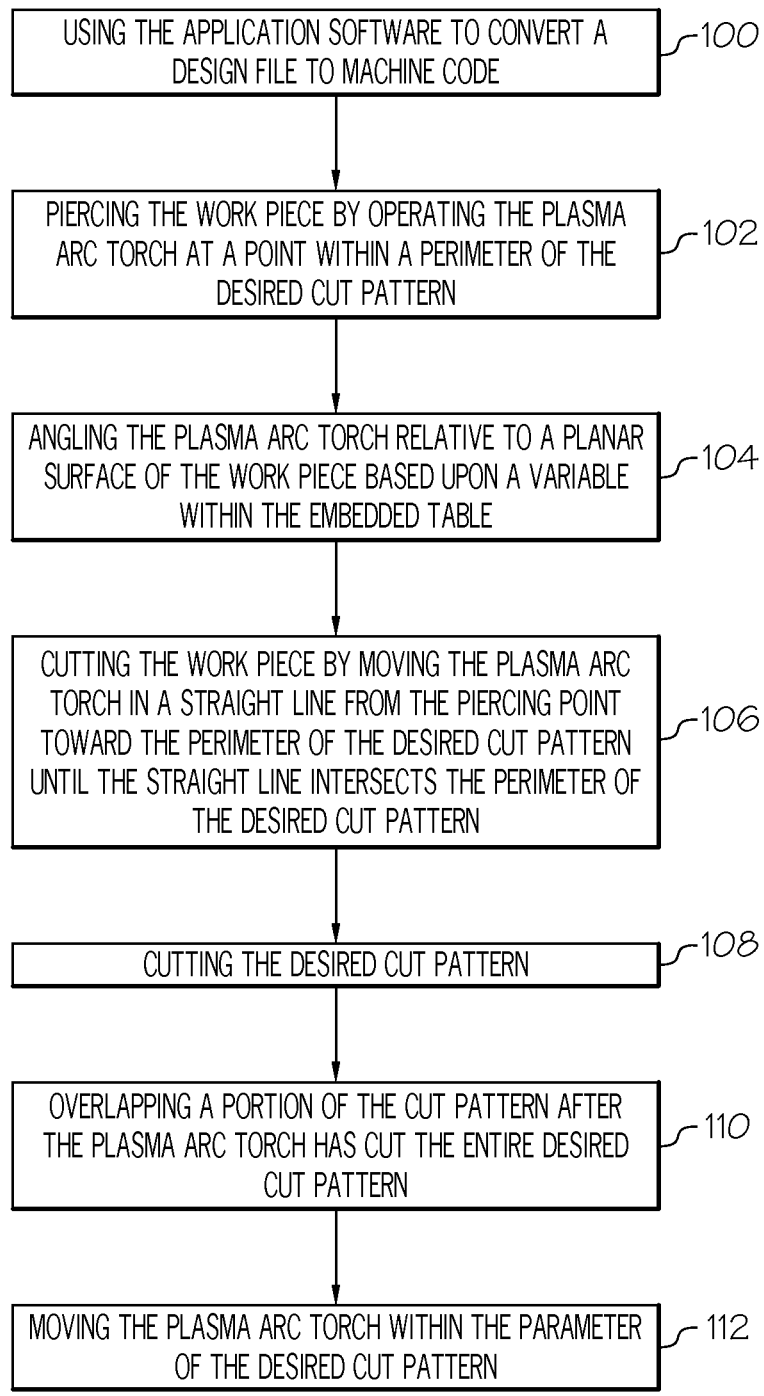
FIG. 6 is a top level flow diagram of a method of operating a plasma arc torch system of FIG. 1 in accordance with an aspect of the present disclosure.

Turning to FIG. 6, another method of operating a plasma arc torch system including a computerized numeric controller and application software is now discussed. The method includes the step 100 of using the application software to convert a design file to machine code, wherein the machine code will be used to manipulate a positioning apparatus to move a plasma arc torch in a desired cut pattern, the application software includes an embedded table. The method also includes the step 102 of piercing the work piece by operating the plasma arc torch at a point within a perimeter of the desired cut pattern. In one example, the step of piercing the work piece is at a point other than the center point of the desired cut pattern.

The method further includes the step 104 of angling the plasma arc torch relative to the planar surface of the work piece based upon at least one variable within the embedded table. As previously described, the CNC locates at least one variable within the embedded table and then positions the plasma arc torch at a desired angle based upon the variables. Then, the plasma arc torch is held at the angle from the perpendicular with the planar surface of the work piece to back burn a produced kerf such that a kerf edge is formed at a particular angle relative to the planar surface of the work piece. In one particular example, the kerf edge produced is perpendicular relative to the planar surface of the work piece. The method still further includes the step 106 of cutting the work piece by moving the plasma arc torch in a straight line from the piercing point toward the perimeter of the desired cut pattern. This straight line can be referred to as a "lead-in." In one example, the lead-in can also include at least two straight lines that are oriented at right angles to one another.

In one example of the method, the lead-in can continue in a straight line and intersect the desired cut pattern prior to the plasma arc torch proceeding along the desired cut pattern. In the prior art, intersecting the desired cut pattern using a perpendicular lead-in with no arc path would be expected to create a notch in the inside diameter of the work piece. However, having the plasma arc torch positioned at the angle relative to the planar surface of the work piece, this undesired notch can be avoided. The straight line lead-in can also originate at the center of the desired cut pattern and intersect the desired cut pattern as a line perpendicular to a line tangent to the desired cut pattern.

The method includes the step 108 of cutting the desired cut pattern. The positioning apparatus moves the plasma arc torch around the perimeter of the desired cut pattern while holding the plasma arc torch at the desired angle from the perpendicular. The method also includes the step 110 of overlapping a portion of the cut pattern after the plasma arc torch has cut the entire desired cut pattern. When the plasma arc torch returns to the position on the desired cut pattern where the lead-in meets the desired cut pattern, the plasma arc torch continues on the desired cut pattern while operating. The plasma arc torch can then traverse a short distance along the already cut desired cut pattern. It is sometimes advantageous to keep this repeated torch-cut distance short, as the plasma jet can skip from the slug to the work piece as the cut slug falls away from the remainder of the work piece. This overlap, or repeated torch-cut distance can be about three degrees. The method further includes the step 112 of moving the plasma arc torch within the perimeter of the desired cut pattern. This can be termed a "lead-out" or "over travel." In one example, the lead-out can include an arc shape. In another example, the lead-out can include a straight line. In yet another example, the lead-out can simply include over travel along the desired cut path which has already been traversed by the plasma arc torch (i.e., over travel). After the lead-out is completed, the plasma arc torch can be turned off. In yet another example, the plasma arc torch can simply be turned off prior to any lead-out as the desired cut pattern is completed.

It is to be understood that the angle can be "locked in" to retain the same angle 66 relative to a particular reference. For example, if the plasma arc torch is cutting a hole from the work piece, the plasma arc torch can pierce the hole inside the desired cut pattern, tilt to the calculated angle from the perpendicular and "lock in" the angle, complete the lead-in, traverse the desired cut pattern, and then traverse the lead-out to finish the hole-cutting operation. The "locked in" angle, for the purposes of this disclosure, means the components of the positioning apparatus orients the torch at an angle relative to a center axis of the hole. As such, the positioning apparatus continuously adjusts the torch orientation as the torch moves about the desired cut pattern in order to maintain the same kerf edge angle relative to the center axis of the hole.

Figure 7:
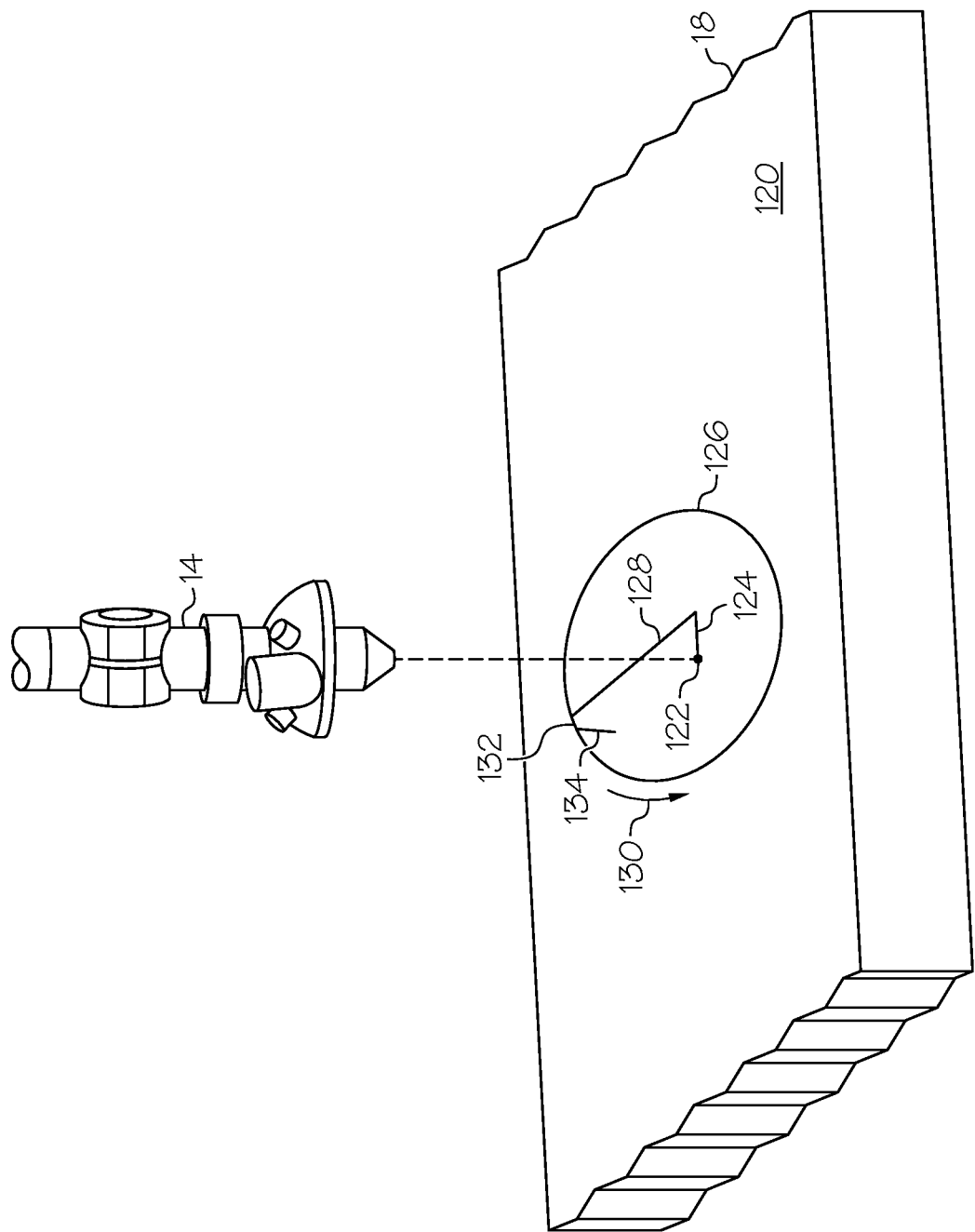
FIG. 7 is a perspective view of an example cut pattern.

Turning to FIG. 7, the work piece 18 can be cut with a particular progression of steps as previously described. In one example, the application software converts a particular design file into machine code. The machine code is then used to control the positioning apparatus 16 to move the torch 14 in relation to the work piece 18 to make cuts within the work piece 18 as they are described within the particular design file. The application software can also include an embedded table of values 68 (best seen in FIG. 4). The table of values 68 can include any number of variables relating to the work piece 18. The CNC 21 retrieves values or variables from the table of values 68 and determines the best angle 66 at which to hold the torch 14 to produce a kerf edge that is perpendicular to the planar surface 120 of the work piece 18. The torch 14 can pierce the work piece 18 at the point 122. In one example, the point 122 is located elsewhere from the center point of the desired cut. The torch 14 can then cut a linear path 124 to toward the desired cut path 126. In one example, the linear path 124 can also include another linear segment 128 forming the lead-in. As the torch 14 intersects the desired cut path 126, it will follow the desired cut path to cut a hole as specified by the design file. In one example, the torch traverses the desired cut path 126 in a counter clockwise direction as represented by arrow 130. As the torch 14 reaches the intersection point of the lead-in linear segment 128 and the desired cut path 126, it continues to travel over a portion of the desired cut path 126 that has already been traversed (i.e., cut) by the torch 14. This portion can be represented by the arc segment 132 as shown in FIG. 7. In one example, the torch 14 traverses over about three degrees of the desired cut path 126. In one example, the torch 14 then turns off, with the cut path 126 being completed. Alternatively, in another example, the torch 14 moves within the perimeter of the desired cut pattern 126 to form a lead-out 134. The lead-out 134 can be a linear segment, an arc, or any other suitable line configuration.

Figure 8:
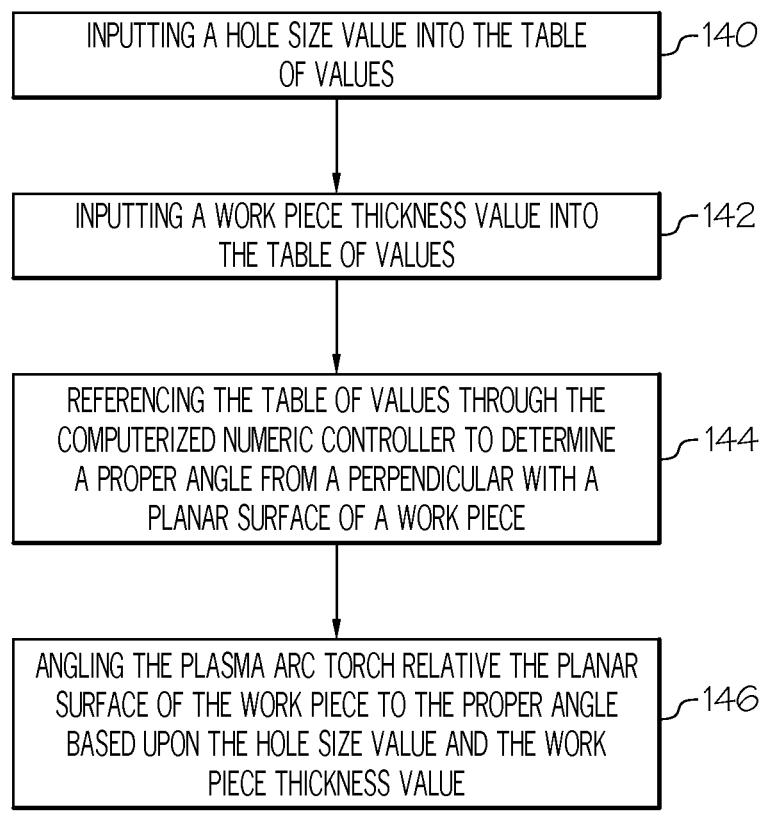
FIG. 8 is a top level flow diagram of a method of operating a plasma arc torch system of FIG. 1 in accordance with an aspect of the present disclosure.

Turning to FIG. 8, another method of operating a plasma arc torch system including a plasma arc torch and a computerized numeric controller is described. The computerized numerical controller includes an embedded table of values. The method includes the step 140 of inputting a hole size value into the table of values. The method also includes the step 142 of inputting a work piece thickness value into the table of values. Both of these steps can be accomplished manually by an operator, electronically by transfer of a design file to the CNC, or in any suitable manner.

The method further includes the step 144 of referencing the table of values through the computerized numeric controller to determine a proper angle from a perpendicular with a planar surface of a work piece. The method still further includes the step 146 of angling the plasma arc torch relative the planar surface of the work piece to the proper angle based upon the hole size value and the work piece thickness value. This angling helps ensure the plasma arc torch is held at the proper angle from the perpendicular with the planar surface to back burn a produced kerf such that a kerf edge is perpendicular relative to the planar surface of the work piece. The described steps of referencing the table of values and angling the plasma arc torch can be completed automatically by the computerized numeric controller and a positioning apparatus without any further input from a machine operator.

While the disclosure has been illustrated and described in typical exemplary embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A material cutting system comprising:
   a table for receiving a work piece, the work piece having a material value and a thickness value;
   a plasma arc torch cutting head for cutting the work piece on the table, wherein the cutting head creates a plasma torch cut taper on a kerf edge;
   a gantry for controlling the position and orientation of the cutting head with respect to a work piece on the table, wherein the gantry moves the cutting head relative to the work piece and the gantry positions the cutting head at an angle relative to a planar surface of the work piece such that the cutting head is held at an angle from a perpendicular with the planar surface of the work piece; and a computerized numeric controller including an application software program, the application software program comprises a table of values, wherein the application software program determines an angle of the cutting head to produce said kerf edge that is perpendicular to the planar surface of the work piece by referencing the material value and the thickness value of the work piece within the table of values, wherein the computerized numeric controller controls the gantry to minimize the plasma torch cut taper by adjusting the cutting head at the angle relative to the perpendicular of the planar surface of the work piece to produce a kerf edge that is perpendicular to the planar surface of the work piece, and the computerized numeric controller causes the gantry to position the cutting head at the angle determined by the application software program.

2. The material cutting system of claim 1, wherein the application software program also references a position cut value within the table of values to determine the angle from the perpendicular to produce a kerf edge that is perpendicular to the planar surface of the work piece.

3. The material cutting system of claim 1, wherein the material value includes an identification of constituent materials within the work piece.

4. The material cutting system of claim 1, wherein the cutting head includes a consumable torch head and the table of values includes a consumable wear value, wherein the application software program further references the consumable wear value to determine the angle from the perpendicular which produces a kerf edge that is perpendicular to the planar surface of the work piece, the computerized numeric controller positions the cutting head at the angle from the perpendicular.

5. The material cutting system according to claim 4, wherein the consumable wear value represents a time of operation of the consumable torch head.

6. The material cutting system according to claim 4, wherein the consumable wear value represents a number of piercing operations completed by the consumable torch head.

7. The material cutting system according to claim 4, wherein the consumable wear value represents an ampere value at which the consumable torch head is operating.

8. A method of operating a material cutting system comprising:

providing a table for receiving a work piece;

providing a plasma arc torch cutting head for cutting the work piece on the table, wherein the cutting head creates a plasma torch cut taper on a kerf edge;

providing a gantry for controlling the position and orientation of the cutting head with respect to a work piece on the table, wherein the gantry moves the cutting head relative to the work piece and the gantry positions the cutting head at an angle relative to a planar surface of the work piece such that the cutting head is held at an angle from a perpendicular with the planar surface of the work piece; and providing a computerized numeric controller including an application software program, wherein the computerized numeric controller controls the gantry by adjusting the cutting head at an angle relative to the perpendicular of the planar surface of the work piece to produce a kerf edge that is perpendicular to the planar surface of the work piece, and the application software program includes a table of values;

determining an angle of the cutting head to produce said kerf edge that is perpendicular to the planar surface of the work piece by referencing a material value and a work piece thickness value within the table of values of the application software program; and positioning the gantry to orient the cutting head at the determined angle.

* * * * *